(12) United States Patent
Ahad

(10) Patent No.: US 7,232,096 B1
(45) Date of Patent: Jun. 19, 2007

(54) POSITIVE LOCK SEAT DEVICE

(76) Inventor: Sam J. Ahad, 24505 Skyridge Dr., Newhall, CA (US) 91321

( * ) Notice: Subject to any disclaimer, the term of this patent is extended or adjusted under 35 U.S.C. 154(b) by 162 days.

(21) Appl. No.: 10/973,829

(22) Filed: Oct. 26, 2004

(51) Int. Cl.
B64D 11/06 (2006.01)

(52) U.S. Cl. .................................................. 244/118.6

(58) Field of Classification Search ............ 244/118.6, 244/122 R, 118.5, 129.1, 131; 248/503.1, 248/500, 502, 503; 296/63, 64
See application file for complete search history.

(56) References Cited

U.S. PATENT DOCUMENTS

| | | | | |
|---|---|---|---|---|
| 2,523,960 A | * | 9/1950 | Liljengren et al. ............ 297/43 |
| 2,606,727 A | * | 8/1952 | De Haven ............... 244/118.6 |
| 2,861,624 A | * | 11/1958 | Anderson et al. ............. 297/43 |
| 3,102,754 A | | 9/1963 | Junkunc ..................... 297/162 |
| 3,145,052 A | | 8/1964 | Morgan ...................... 297/354 |
| 3,392,954 A | * | 7/1968 | Malitte ....................... 248/429 |
| 3,730,019 A | | 5/1973 | Ballard ........................ 74/502 |
| 4,105,177 A | * | 8/1978 | Smith et al. ................ 248/564 |
| 4,354,398 A | | 10/1982 | Porter ......................... 74/501 |
| 4,376,522 A | * | 3/1983 | Banks ..................... 248/503.1 |
| 4,498,649 A | * | 2/1985 | Toll ........................ 244/118.6 |
| 4,509,888 A | * | 4/1985 | Sheek ........................ 410/105 |
| 4,634,182 A | | 1/1987 | Tanaka ........................ 297/379 |
| 4,662,676 A | | 5/1987 | Havelock .................... 297/194 |
| 4,723,732 A | * | 2/1988 | Gorges .................... 244/118.6 |
| 4,771,969 A | * | 9/1988 | Dowd ..................... 244/118.6 |
| 4,776,533 A | * | 10/1988 | Sheek et al. ............. 244/118.6 |
| 4,796,837 A | * | 1/1989 | Dowd .................... 244/122 R |
| 4,856,738 A | * | 8/1989 | Martin ................... 244/122 R |
| 4,887,864 A | | 12/1989 | Ashton ....................... 297/375 |
| 4,932,816 A | * | 6/1990 | Ligensa ...................... 410/105 |
| 4,944,552 A | | 7/1990 | Harris ........................ 297/145 |
| 5,029,822 A | | 7/1991 | Selzer ....................... 267/64.12 |
| 5,058,829 A | * | 10/1991 | Bentley ................... 244/122 R |
| 5,083,726 A | * | 1/1992 | Schurr ..................... 244/118.6 |
| 5,169,091 A | * | 12/1992 | Beroth .................... 244/122 R |
| 5,178,346 A | * | 1/1993 | Beroth .................... 244/122 R |
| 5,180,120 A | * | 1/1993 | Simpson et al. ......... 244/118.6 |
| D333,420 S | | 2/1993 | Bales et al. .................. D8/349 |
| 5,193,765 A | * | 3/1993 | Simpson et al. ......... 244/118.6 |
| 5,284,379 A | * | 2/1994 | Arnold et al. .............. 297/113 |
| 5,333,818 A | * | 8/1994 | Brandt et al. ............ 244/118.6 |
| 5,337,979 A | * | 8/1994 | Bales et al. .............. 244/118.1 |
| 5,383,630 A | * | 1/1995 | Flatten .................... 244/118.6 |
| 5,425,516 A | * | 6/1995 | Daines .................... 244/118.6 |
| 5,449,132 A | * | 9/1995 | Gilbert .................... 244/122 R |
| 5,451,092 A | | 9/1995 | Gray .......................... 297/122 |
| 5,489,172 A | * | 2/1996 | Michler ...................... 410/105 |
| 5,553,923 A | | 9/1996 | Bilezikjian ............... 297/452.2 |
| 5,558,391 A | | 9/1996 | Chavous ..................... 297/153 |
| 5,564,654 A | * | 10/1996 | Nordstrom ............... 244/118.1 |
| 5,651,587 A | | 7/1997 | Kodaverdian .......... 297/423.36 |
| 5,762,296 A | | 6/1998 | Gilbert .................... 244/118.1 |

(Continued)

*Primary Examiner*—Teri Pham Luu
*Assistant Examiner*—Stephen A. Holzen
(74) *Attorney, Agent, or Firm*—MacCord Mason PLLC

(57) ABSTRACT

An improved seating apparatus for an aircraft comprising: a seat assembly and a positive lock device for securing the seat assembly to the aircraft. In the preferred embodiment, the positive lock device comprises: an adjustable force applicator for selectively applying force, a track fitting for insertion into an aircraft seat track, a rigid force bearer having a top region and for transferring force to an aircraft seat track, and a lock plate biased toward the applicator head. Also, in the preferred embodiment, the seat assembly includes a seat leg.

44 Claims, 3 Drawing Sheets

U.S. PATENT DOCUMENTS

| | | | |
|---|---|---|---|
| 5,765,911 A | 6/1998 | Sorenson | 297/173 |
| 5,794,470 A | 8/1998 | Stringer | 70/261 |
| 5,806,932 A | 9/1998 | Zhuang | 297/361.1 |
| 5,810,290 A * | 9/1998 | Merensky et al. | 244/118.6 |
| 5,871,259 A | 2/1999 | Gehart | 297/362.12 |
| 5,871,318 A * | 2/1999 | Dixon et al. | 410/105 |
| 5,887,949 A | 3/1999 | Kodaverdian | 297/423.36 |
| 5,890,765 A * | 4/1999 | LaPointe et al. | 297/354.13 |
| 5,992,798 A * | 11/1999 | Ferry | 244/118.6 |
| 6,003,394 A * | 12/1999 | Heckel, Jr. | 74/89.36 |
| 6,019,429 A * | 2/2000 | Tedesco | 297/328 |
| 6,086,155 A * | 7/2000 | Stiffler | 297/362 |
| 6,106,067 A * | 8/2000 | Zhuang et al. | 297/361.1 |
| 6,119,980 A * | 9/2000 | Ferry | 244/122 R |
| 6,176,547 B1 * | 1/2001 | Fran.cedilla.ois et al. | 297/257 |
| 6,260,813 B1 * | 7/2001 | Whitcomb | 248/503.1 |
| 6,279,416 B1 * | 8/2001 | Bucholtz et al. | 74/501.5 H |
| 6,601,798 B2 * | 8/2003 | Cawley | 244/118.6 |
| 6,669,295 B2 * | 12/2003 | Williamson | 297/362.13 |
| 6,793,282 B2 * | 9/2004 | Plant et al. | 297/248 |
| 6,799,805 B2 * | 10/2004 | Johnson | 297/452.2 |
| 6,902,365 B1 * | 6/2005 | Dowty | 410/105 |
| 7,021,596 B2 * | 4/2006 | Lory | 248/429 |
| 7,066,551 B2 * | 6/2006 | Johnson | 297/452.18 |
| 2004/0415225 | 7/2004 | Alter | 297/367 |
| 2005/0133666 A1 * | 6/2005 | Zerner | 244/118.6 |
| 2006/0091707 A1 * | 5/2006 | Ahad | 297/145 |
| 2006/0102784 A1 * | 5/2006 | Callahan et al. | 244/118.6 |

* cited by examiner

POSITIVE LOCK SEAT DEVICE

BACKGROUND OF THE INVENTION (1) Field of the Invention

The present invention relates generally to an improved seating apparatus for an aircraft and, more particularly, to a positive lock seat device for securing a seat assembly to an aircraft.

(2) Description of the Prior Art

Traditionally, the rear seat track locking device for a seating apparatus for a commercial aircraft consisted of a threaded locking screw, a conventional lock washer, a shear plunger, and a track fitting. A locking ring to retain the screw and a spring may have been installed inside the plunger. When the screw was tightened, it was drawn into the track fitting. This will engage the shear plunger with a floor mounting track and force crescent-shaped ears on the bottom of a track fitting up against the floor mounting track, holding the seating apparatus in place.

One of the problems with such a traditional seat track locking device is that if the screw was not properly tightened, the lock washer may not have been engaged with the screw. This would allow the screw to turn and loosen, which caused the fitting to become loose in the floor mounting track. Furthermore, there was no visual indication that the seat track fitting was not properly installed in the rear seat track. Thus, there remains a need for a positive lock seat device for securing a seat assembly to an aircraft. The positive lock seat device should include a visual indicator for indicating that the seat track fitting is not properly installed.

SUMMARY OF THE INVENTION

The present invention is directed to an improved seating apparatus for an aircraft comprising: a seat assembly; and a positive lock device for securing the seat assembly to the aircraft. In the preferred embodiment, the positive lock device comprises: an adjustable force applicator for selectively applying force, a track fitting for insertion into an aircraft seat track, a rigid force bearer having a top region and for transferring force to an aircraft seat track, and a lock plate biased toward the applicator head. Also, in the preferred embodiment, the seat assembly includes a seat leg.

In an embodiment of the invention, the apparatus may further including a seat track for engaging the fitting. The track may include a top, bottom, and at least one side defining a slot for retaining the fitting. The top of the track may include opposing edges generally parallel to the sides of the track. The distance between the opposing edges may change along at least a portion of the track.

In an embodiment of the invention, the track fitting extends downwardly from the seat assembly. The fitting may include a head portion. The fitting may include a neck portion. The head portion of the fitting may be larger than the neck portion of the fitting measured transverse the downward extension of the fitting.

In an embodiment, the apparatus may further include a generally cylindrical wall in the force bearer defining an aperture for passing at least a portion of the force applicator through the force bearer. The apparatus may further include plurality of upwardly extending portions near the top region of the force bearer defining a space for receiving the lock plate. The apparatus may further include a visual indicator for indicating a lock position. At least a part of the visual indicator may exist on the surface of the lock plate. At least a part of the visual indicator may exist on the surface of the force bearer. The apparatus may further include a spring for biasing the lock plate toward the applicator head. The spring may include a spring washer. The apparatus may further include a head on the force applicator.

In an embodiment of the invention, the seat assembly may include a seat back. The seat assembly may include an armrest. The seat assembly may include a headrest. The seat assembly may include a serving tray. The seat assembly may include seat controls. The seat controls may include seat recline control.

Accordingly, one aspect of the present invention is to provide an improved seating apparatus for an aircraft comprising: a seat assembly; and a positive lock device for securing the seat assembly to the aircraft.

Another aspect of the present invention is to provide a positive lock apparatus for securing a seat assembly to an aircraft, the positive lock apparatus comprising: an adjustable force applicator for selectively applying force; a track fitting for insertion into an aircraft seat track; a rigid force bearer having a top region and for transferring force to an aircraft seat track; and a lock plate biased toward the applicator head.

Still another aspect of the present invention is to provide an improved seating apparatus for an aircraft comprising: a seat assembly including a seat leg and a positive lock device for securing the seat assembly to the aircraft comprising: an adjustable force applicator for selectively applying force, a track fitting for insertion into an aircraft seat track, a rigid force bearer having a top region and for transferring force to an aircraft seat track, and a lock plate biased toward the applicator head.

These and other aspects of the present invention will become apparent to those skilled in the art after a reading of the following description of the preferred embodiment when considered with the drawings.

DESCRIPTION OF THE PREFERRED EMBODIMENTS

Figure 1:
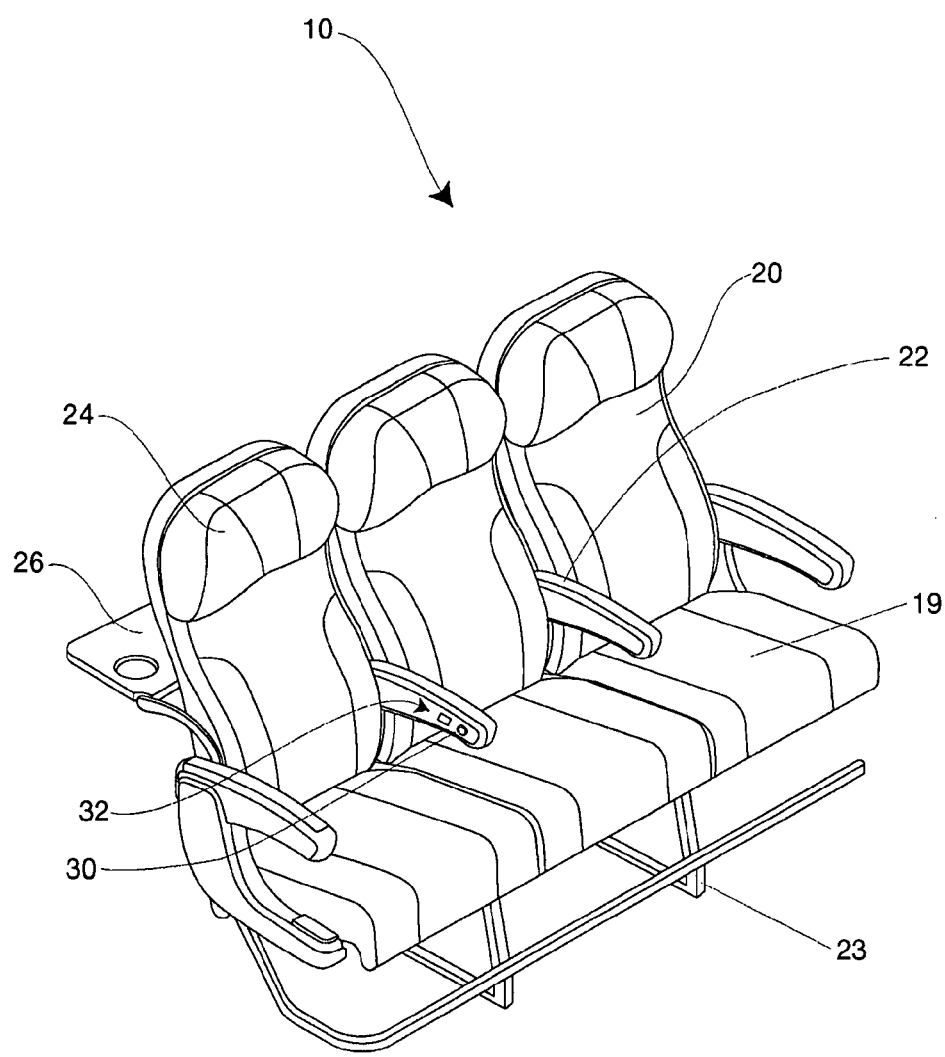
FIG. 1 is a perspective view of an improved seating apparatus for an aircraft constructed according to the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, the illustrations are for the purpose of describing a preferred embodiment of the invention and are not intended to limit the invention thereto. As best seen in FIG. 1, an improved seating apparatus for an aircraft, generally designated 10, is shown constructed according to the present invention. The improved seating apparatus 10 includes a seat assembly 19 and a positive lock device for securing the seat assembly to an aircraft. The seat assembly 19 includes a seat leg 23, a seat back 20, an armrest 22, a headrest 24, a serving tray 26 and seat controls 32. The seat controls 32, include a seat recline control 30.

Figure 2:
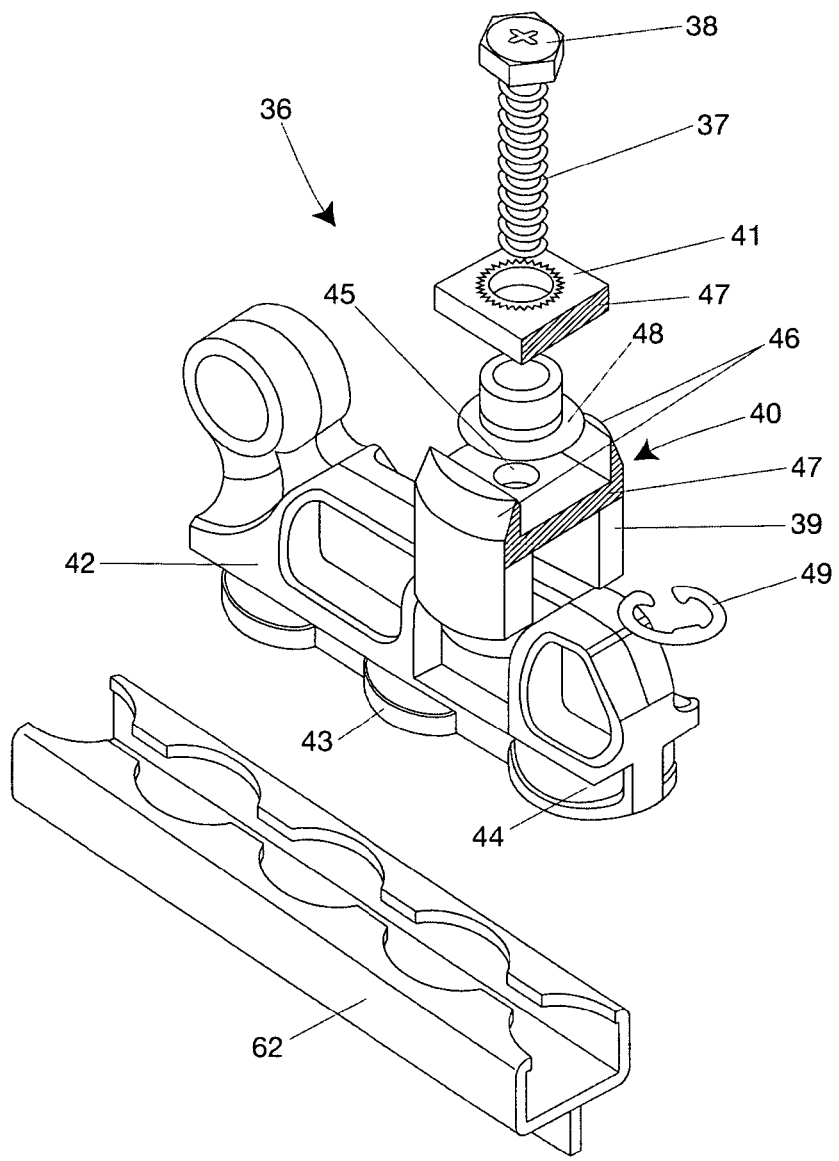
FIG. 2 is an enlarged perspective view of a positive lock device for securing a seat assembly to an aircraft.

FIG. 2 is a perspective view of the positive lock device 36 and a seat track 60 for securing the seat assembly to an aircraft. The positive lock device 36 includes an adjustable force applicator 37 having a head 38 for selectively applying force; a track fitting 42 for insertion into an aircraft seat track; a rigid force bearer 39, having a top region 40 for transferring force to an aircraft seat track; and a lock plate 41 biased toward the applicator head 38.

The track fitting 42 extends downwardly at the bottom of the device 36 for insertion into a seat track 60. The track fitting 42 includes a head portion 43. The track fitting includes a neck portion 44. The head portion 43 of the track fitting 42 is larger than the neck portion 44 of the track fitting 42 measured transverse the downward extension of the track fitting 42.

The force bearer 39 includes a generally cylindrical wall 45 defining an aperture for passing at least a portion of the force applicator 37 through the force bearer 39. The force bearer 39 includes a plurality of upwardly extending portions 46 near the top region 40 of the force bearer 39, defining a space for receiving the lock plate 41.

The positive lock device 36 includes a visual indicator 47 for indicating a lock position. A part of the visual indicator exists on the surface of the lock plate 41 and a part of the visual indicator exists on the surface of the force bearer 39.

The positive lock device 36 includes a spring 48 for biasing the lock plate 41 toward the applicator head 38. The spring is a spring washer. The positive lock device 36 also includes a locking ring 49 for retaining the force bearer 39 snug against the force applicator 37.

Figure 3:
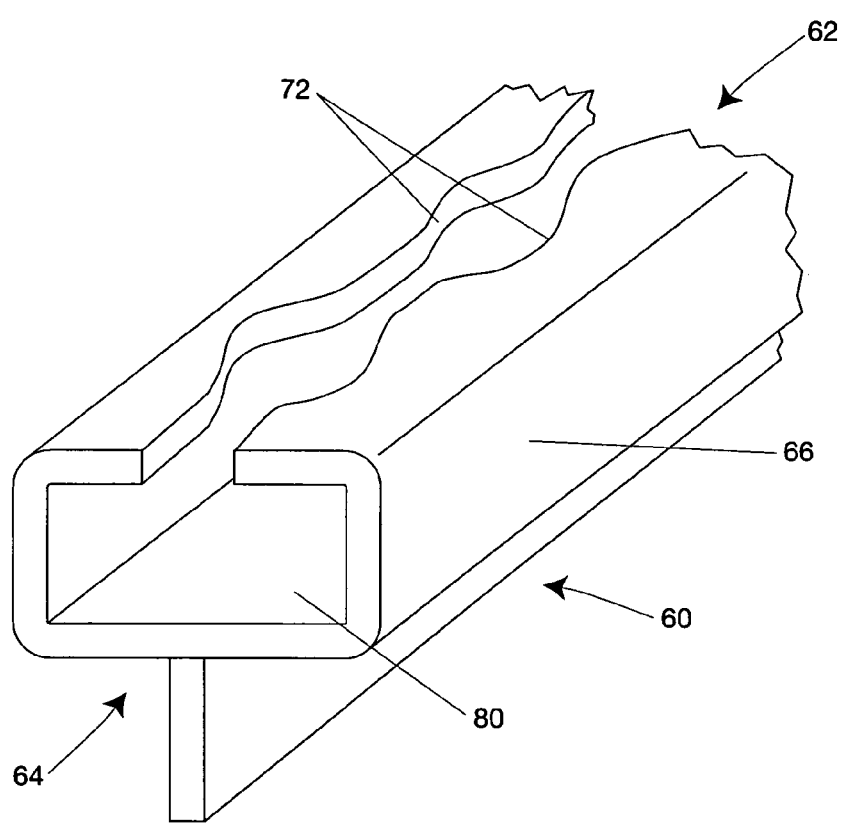
FIG. 3 is a cross-sectional perspective view of a seat track for an aircraft.

FIG. 3 shows the seat track 60 for engaging the fitting of the positive lock device. The track includes a top 62, bottom 64, and at least one side 66 defining a slot for retaining the fitting. The top 62 of the track includes opposing edges 72 generally parallel to the sides 66 of the track. The distance between the opposing edges changes along at least a portion of the track.

In operation, the spring washer pushes the lock plate upward to engage the head of the force applicator, which prevents the force applicator from turning. In order to tighten of loosen the force applicator, an ordinary box-end or socket wrench can be placed over the head of the force applicator. This pushes the lock plate down, away from the head of the force applicator, allowing it to turn. When the force applicator is turned to tighten the seating apparatus into a desired position, the force bearer transfers force downward to the aircraft seat track. The downward force will engage force bearer 39 into the wide opposing edges 72 of the seat track 60, this will positively lock the seat leg 23 in the anti-rattle seat track 60. The head of the fitting is thus forced against the bottom surface of the top of the track, and friction prevents the fitting from moving along the track. When the force applicator is properly tightened and the wrench is removed, it is positively locked and will not come loose. If the positive lock device is not properly installed and tightened, the visual indicator is exposed above the track fitting thus indicating improper engagement with the seat track.

Certain modifications and improvements will occur to those skilled in the art upon a reading of the foregoing description. By way of example, the lock plate 41 can be different shapes and can be engaged with force bearer 39 in different methods such as pin lock, "V" groove or side legs. In addition, the applicator head may be of different shapes, such as square or spline head. Also, the spring 48 can be a standard compression spring or leaf spring. All such modifications and improvements have been deleted herein for the sake of conciseness and readability but are properly within the scope of the following claims.

I claim:
1. An improved seating apparatus for an aircraft comprising:
   (a) a seat assembly; and
   (b) a positive lock device for securing the seat assembly to the aircraft including:
      (i) an adjustable force applicator for selectively applying force;
      (ii) a track fitting for insertion into an aircraft seat track;
      (iii) a rigid force bearer for transferring force to an aircraft seat track;
      (iv) a lock plate receiving the force applicator and biased toward an applicator head; and
      (v) further including a plurality of upwardly extending portions near the top region of the force bearer defining a space for receiving the lock plate.
2. The apparatus according to claim 1, wherein the seat assembly includes a seat leg.
3. The apparatus according to claim 1, wherein the seat assembly includes a seat back.
4. The apparatus according to claim 1, wherein the seat assembly includes an armrest.
5. The apparatus according to claim 1, wherein the seat assembly includes a headrest.
6. The apparatus according to claim 1, wherein the seat assembly includes a serving tray.
7. The apparatus according to claim 1, wherein the seat assembly includes seat controls.
8. The apparatus according to claim 7, wherein the seat controls include seat recline control.
9. A positive lock apparatus for securing a seat assembly to an aircraft, the positive lock apparatus comprising:
   (a) an adjustable force applicator for selectively applying force;
   (b) a track fitting for insertion into an aircraft seat track;
   (c) a rigid force bearer for transferring force to an aircraft seat track;
   (d) a lock plate receiving the force applicator and biased toward an applicator head; and
   (e) further including a plurality of upwardly extending portions near the top region of the force bearer defining a space for receiving the lock plate.
10. The apparatus according to claim 9 further including a seat track for engaging the fitting.
11. The apparatus according to claim 10, wherein the track includes a top, bottom, and at least one side defining a slot for retaining the fitting.
12. The apparatus according to claim 11, wherein the top of the track includes opposing edges generally parallel to the sides of the track.
13. The apparatus according to claim 12, wherein the distance between the opposing edges changes along at least a portion of the track.
14. The apparatus according to claim 9, wherein the fitting extends downwardly from the seat assembly.
15. The apparatus according to claim 14, wherein the fitting includes a head portion.
16. The apparatus according to claim 15, wherein the fitting includes a neck portion.

17. The apparatus according to claim 16, wherein the head portion of the fitting is larger than the neck portion of the fitting measured transverse the downward extension of the fitting.

18. The apparatus according to claim 9 further including a generally cylindrical wall in the force bearer defining an aperture for passing at least a portion of the force applicator through the force bearer.

19. The apparatus according to claim 9 further including a visual indicator for indicating a lock position.

20. The apparatus according to claim 19, wherein at least a part of the visual indicator exists on the surface of the lock plate.

21. The apparatus according to claim 19, wherein at least a part of the visual indicator exists on the surface of the force bearer.

22. The apparatus according to claim 9, further including a spring for biasing the lock plate toward the applicator head.

23. The apparatus according to claim 22, wherein the spring includes a spring washer.

24. An improved seating apparatus for an aircraft comprising:
(a) a seat assembly including a seat leg; and
(b) a positive lock device for securing the seat assembly to the aircraft comprising:
  (i) an adjustable force applicator for selectively applying force;
  (ii) a track fitting for insertion into an aircraft seat track;
  (iii) a rigid force bearer for transferring force to an aircraft seat track;
  (iv) a lock plate receiving the force applicator and biased toward an applicator head; and
  (v) further including a plurality of upwardly extending portions near the top region of the force bearer defining a space for receiving the lock plate.

25. The apparatus according to claim 24, wherein the seat assembly includes a seat back.

26. The apparatus according to claim 24, wherein the seat assembly includes an armrest.

27. The apparatus according to claim 24, wherein the seat assembly includes a headrest.

28. The apparatus according to claim 24, wherein the seat assembly includes a serving tray.

29. The apparatus according to claim 24, wherein the seat assembly includes seat controls.

30. The apparatus according to claim 29, wherein the seat controls include seat recline control.

31. The apparatus according to claim 24 further including a seat track for engaging the fitting.

32. The apparatus according to claim 31, wherein the track includes a top, bottom, and at least one side defining a slot for retaining the fitting.

33. The apparatus according to claim 32, wherein the top of the track includes opposing edges generally parallel to the sides of the track.

34. The apparatus according to claim 33, wherein the distance between the opposing edges changes along at least a portion of the track.

35. The apparatus according to claim 24, wherein the fitting extends downwardly from the seat assembly.

36. The apparatus according to claim 35, wherein the fitting includes a head portion.

37. The apparatus according to claim 36, wherein the fitting includes a neck portion.

38. The apparatus according to claim 37, wherein the head portion of the fitting is larger than the neck portion of the fitting measured transverse the downward extension of the fitting.

39. The apparatus according to claim 24 further including a generally cylindrical wall in the force bearer defining an aperture for passing at least a portion of the force applicator through the force bearer.

40. The apparatus according to claim 24 further including a visual indicator for indicating a lock position.

41. The apparatus according to claim 40, wherein at least a part of the visual indicator exists on the surface of the lock plate.

42. The apparatus according to claim 40, wherein at least a part of the visual indicator exists on the surface of the force bearer.

43. The apparatus according to claim 24 further including a spring for biasing the lock plate toward the applicator head.

44. The apparatus according to claim 43, wherein the spring includes a spring washer.

* * * * *